US012766479B2

(12) United States Patent
Zhang et al.

(10) Patent No.: US 12,766,479 B2
(45) Date of Patent: Oct. 20, 2026

(54) PREPARATION SYSTEM OF ETHYLENE BY ETHANOL DEHYDRATION AND DEVICE THEREOF

(71) Applicant: TIANJIN UNIVERSITY, Tianjin (CN)

(72) Inventors: Minhua Zhang, Tianjin (CN); Hao Gong, Tianjin (CN); He Dong, Tianjin (CN); Feng Shi, Tianjin (CN); Yingzhe Yu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 803 days.

(21) Appl. No.: 18/207,495

(22) Filed: Jun. 8, 2023

(65) Prior Publication Data

US 2023/0405543 A1 Dec. 21, 2023

(30) Foreign Application Priority Data

Jun. 15, 2022 (CN) ........................ 202210671939.5

(51) Int. Cl.

*B01J 19/00* (2006.01)
*B01D 53/26* (2006.01)
*B01J 19/24* (2006.01)

(52) U.S. Cl.

CPC ........ *B01J 19/0013* (2013.01); *B01D 53/261* (2013.01); *B01J 19/245* (2013.01); *B01D 2253/116* (2013.01); *B01D 2256/24* (2013.01); *B01D 2257/80* (2013.01); *B01D 2259/4009* (2013.01); *B01J 2219/0004* (2013.01); *B01J 2219/00159* (2013.01)

(58) Field of Classification Search

None

See application file for complete search history.

(56) References Cited

FOREIGN PATENT DOCUMENTS

CN 113045372 A * 6/2021 .............. C07C 7/13

OTHER PUBLICATIONS

Zhang et al. CN103045372A—translated document (Year: 2021).*

* cited by examiner

*Primary Examiner* — Jelitza M Perez

(57) ABSTRACT

The present invention relates to a preparation system of ethylene by ethanol dehydration and device thereof. The device includes an ethanol dehydration reaction system, a quenching compression system, an alkaline washing system, a molecular sieve drying system, an ethylene purification system and a propylene refrigeration cycle system. Part of ethylene produced by the ethylene purification system are used as circulating ethylene in the molecular sieve drying system for desorption regeneration of molecular sieve drying towers. The molecular sieve drying system includes the steps: (1) feeding crude ethylene and water from the alkaline washing system into the molecular sieve drying system, and after removing the water therefrom, feeding the obtained crude ethylene into the ethylene purification system; and (2) feeding part of the products of ethylene, as the circulating ethylene, produced by the ethylene purification system into the molecular sieve drying system.

11 Claims, 3 Drawing Sheets

PREPARATION SYSTEM OF ETHYLENE BY ETHANOL DEHYDRATION AND DEVICE THEREOF

CROSS-REFERENCE TO RELATED APPLICATIONS

This application claims priority from the Chinese patent application CN2022106719395 filed Jun. 15, 2022, the content of which are incorporated herein in the entirety by reference.

TECHNICAL FIELD

The present invention relates to a preparation system of ethylene by ethanol dehydration and device thereof, in particular to a dehydrating and drying process and device for an ethylene molecular sieve.

BACKGROUND ART

Ethylene is the most important organic chemical raw material, and its industrial scale, yield and technical level become important symbols for the development of the national chemical industry. Throughout the world, ethylene raw materials in industrialized countries are mainly light raw materials. Ethylene produced with naphtha as a cracking raw material accounts for about 50% of the total ethylene yield in the world; ethane is the second largest cracking raw material, and ethylene produced by cracking of the ethane accounts for about 28% of the total ethylene yield in the world; and the ethylene produced by cracking of the above two raw materials goes beyond 75% of the total yield, and the rest of ethylene is mainly prepared from liquefied petroleum gas (LPG), condensate oil, middle distillate and the like as raw materials.

The preparation system of ethylene from ethanol is achieved by ethanol dehydration under the action of appropriate temperature and catalysts, and the preparation system of ethylene by the catalytic dehydration of ethanol is the earliest technological method for the preparation system of ethylene in industry. Unlike fossil raw materials for the preparation system of ethylene, the raw material for the preparation system of ethylene from ethanol is ethanol, which may be obtained by fermentation of biomass. Biomass is characterized by renewability, low pollution and wide distribution. Important biomass capable of supplying energy includes wood, wood wastes, crops, wastes generated during food processing, aquatic plants and the like. The process route of the preparation system of ethylene from biomass ethanol also has the advantages of short construction period, relatively less investment, mild production conditions and the like; and in the preparation system of ethylene by the production process, $CO_2$ emissions are reduced, and products have high purity and simple compositions, so that they are relatively easy to separate and purify.

The technological process of the preparation system of ethylene by dehydrating ethanol usually includes two parts of an ethanol dehydration reaction section and an ethylene product purification section. Ethanol raw materials enter a dehydration reactor after being evaporatively preheated to generate crude ethylene, then the crude ethylene sequentially enters a washing tower, an alkaline washing tower, a drying tower, a de-light component tower, a de-heavy component tower and the like, so as to remove polar materials, $CO_2$, $H_2O$, light component byproducts, heavy component byproducts and the like, and finally ethylene products are obtained on a top of the de-heavy component tower.

Reaction products generated in the preparation system of ethylene from ethanol contain a large amount of water, the crude ethylene also contains a large amount of water after being leached with desalted water in the alkaline washing tower, ethylene needs to be refined at low temperature, and if the water is brought into a low-temperature separation system, it will freeze at low temperature, leading to blockage of equipment and pipelines; and in addition to blockage caused by freezing of the water at low temperature, the water and hydrocarbons may generate white crystalline hydrates at high pressure and low temperature, and these hydrates will also be accumulated in the pipelines to cause blockage, so that it is necessary to dry ethylene before rectification.

A molecular sieve main body of a traditional molecular sieve drying device may be incapable of adsorbing water vapor after dehydrating and drying introduced gas materials for a period of time, at this moment, it is necessary for workers to replace the molecular sieve main body, however, the replacement operation is usually complicated, with time and labor wasted; it is necessary to stop drying to-be-dehydrated gas within the time for replacing the molecular sieve main body, in which reduces the working efficiency of the device; and it is necessary to manually monitor whether the molecular sieve main body needs to be replaced constantly, so that the automation degree is low.

CN201210248326.7 disclosed a regeneration method and equipment for a molecular sieve, which describes space gas replacement and thermal regeneration of a molecular sieve adsorption device achieving adsorption saturation with $N_2$ in detail. However, the method needs to perform material replacement before the termination of regeneration if being used for a drying tower of an ethylene device, leading to waste of a large quantity of materials and time in the process, and certain pollution will be caused due to $N_2$ emptying.

In CN201910089250.X, a crystal structure is reconstructed by blending and stirring an inactivated drying agent with raw materials for preparing a molecular sieve, however, this method is not suitable for a closed continuous dehydration molecular sieve.

The present invention aims at providing a novel molecular sieve drying process for a device for preparing ethylene by ethanol dehydration. Internal circulation of ethylene is achieved by introducing part of ethylene, as desorbed gas, in an ethylene purification system in the device into a molecular sieve system for regeneration of the drying tower, thereby solving the problems of material waste and environmental pollution caused by the use of other desorbed gases.

SUMMARY OF THE PRESENT INVENTION

The present invention relates to a preparation system of ethylene by ethanol dehydration, in particular to a dehydrating and drying process and method for an ethylene molecular sieve. The present invention aims at providing a novel molecular sieve drying process for a device for preparing ethylene by ethanol dehydration.

A technical solution of the present invention is as follows:

A preparation system of ethylene by ethanol dehydration, includes an ethanol dehydration reaction system, a quenching compression system, an alkaline washing system, a molecular sieve drying system, an ethylene purification system and a propylene refrigeration cycle system; and a technical solution adopted by the molecular sieve drying system includes the following steps:

(1) feeding crude ethylene and water from the alkaline washing system into the molecular sieve drying system, and after removing the water therefrom, feeding the obtained crude ethylene into the ethylene purification system; and (2) feeding part of ethylene, acting as circulating ethylene, produced by the ethylene purification system into the molecular sieve drying system to serve as desorbed gas for regeneration of drying towers; and feeding the desorbed circulating ethylene back to the quenching compression system after cooling compression.

In the process for preparing the ethylene by ethanol dehydration, the molecular sieve drying system includes a circulating ethylene preheater, ethylene drying towers, ethylene drying tower protectors, a circulating ethylene cooler, a circulating ethylene compressor unit and a complete set of heating and conveying equipment; the ethylene drying towers and the protectors thereof need to be regenerated after adsorption saturation; the regeneration process consists of depressurizing, heating, cooling and pressurizing processes; and in the depressurizing process, gases exhausted out of the ethylene drying towers and the protectors thereof are fed into a quenching tower after being boosted by the circulating ethylene compressor unit. After pressure of the drying towers is decreased to a set value, the circulating ethylene from the circulating ethylene preheater is used for purging and heating from bottom to top, and the circulating ethylene is firstly heated to a set value by the circulating ethylene preheater to perform purging and heating on beds of the drying towers. Heating stops after temperature of the beds rises to a set value, and the circulating ethylene continues to perform purging and cooling on the beds of the drying towers; gases exhausted during heating and cooling of the beds are cooled by the circulating ethylene cooler and fed into the quenching tower after being boosted by the circulating ethylene compressor unit; and after the drying towers are cooled to certain temperature, firstly, the circulating ethylene is used for pressurizing the beds, after pressure of the beds reaches a set value, high-pressure dry ethylene exhausted out of the drying towers during adsorption operation continues to pressurize the beds into a balanced state, and the regenerated drying towers wait for entering a next adsorption/regeneration cycle.

Pressure of desorption operation of the drying towers is 0.06-2.00 Mpa, and the temperature of desorption operation is 100° C.-140° C.

The present invention provides a device for performing the preparation system of ethylene by ethanol dehydration. In the molecular sieve drying system, gas phase outlets of gas-liquid separation tanks are respectively connected with tops of a first ethylene drying tower and a second ethylene drying tower through pipelines; a tower kettle of the first ethylene drying tower is respectively connected with tops of a first ethylene drying tower protector and a second ethylene drying tower protector; a tower kettle of the second ethylene drying tower is respectively connected with the tops of the first ethylene drying tower protector and the second ethylene drying tower protector; the tower kettle of the first ethylene drying tower, a tower kettle of the first ethylene drying tower protector, the tower kettle of the second ethylene drying tower and a tower kettle of the second ethylene drying tower protector are connected with an outlet in a heating side of the circulating ethylene preheater; the tops of the first ethylene drying tower and the second ethylene drying tower are connected with an inlet in a cooling side of the circulating ethylene cooler; an outlet in the cooling side of the circulating ethylene cooler is connected with an inlet of the circulating ethylene compressor unit; and the tower kettles of the first ethylene drying tower protector and the second ethylene drying tower protector are connected with an inlet in a cooling side of a circulating ethylene precooler.

The present invention has following advantages and beneficial effects:

as the novel crude ethylene dehydrating process and device, the preparation system and device for preparing the ethylene by ethanol dehydration in the present invention have the advantages that part of the products of ethylene, acting as the circulating ethylene, in the ethylene purification system provide the desorbed gas for regeneration of the drying towers. By using the circulating ethylene as the desorbed gas, not only pollution caused by other desorbed gases (such as nitrogen) is avoided, but also the green production level is improved. The maximum adsorption capacity of the molecular sieve type 3A may reach 20%, the water content obtained after the circulating ethylene is desorbed is about 2% to 6%, and the water content of the dried crude ethylene may be below 1 ppm, which is far less than the standard water content of 5 ppm entering the ethylene purification system.

DETAILED DESCRIPTION OF THE EMBODIMENTS

Figure 1:
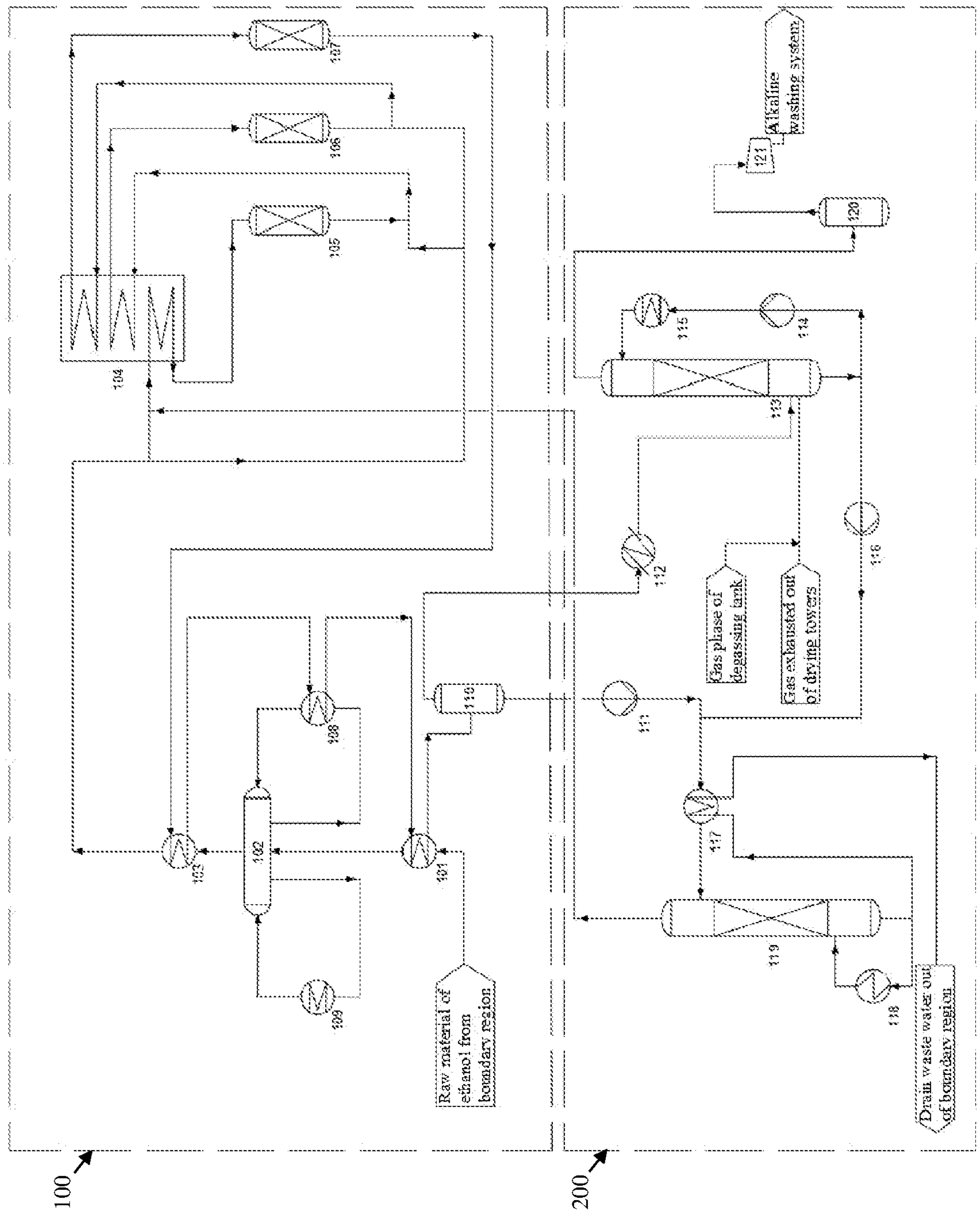
FIG. 1 is a flow diagram of an ethanol dehydration reaction system and a quenching compression system of a preparation system of ethylene by ethanol dehydration according to the present invention.

The present invention is further described in detail below with reference to FIGS. 1, 2 and 3 and specific embodiments. The following embodiments are merely descriptive and not restrictive, and do not limit the scope of protection of the present invention.

The present invention provides a preparation system of ethylene by ethanol dehydration, including the following technical solution:

(1) Ethanol is fed into an ethanol dehydration reaction system for dehydration reaction to obtain reaction gas;

(2) the reaction gas is cooled in a quenching compression system and separated therefrom, and recovered steam returns to the ethanol dehydration reaction system;

(3) crude ethylene, carbon dioxide and water are fed into an alkaline washing system to remove the carbon dioxide component therefrom, so as to obtain the crude ethylene and the water;

(4) the crude ethylene and the water obtained from the alkaline washing system are fed into a molecular sieve drying system, and after the water therefrom is removed, the obtained crude ethylene is fed into an ethylene purification system;

(5) part of ethylene production, acting as circulating ethylene, produced by the ethylene purification system are fed into the molecular sieve drying system to supply desorbed gas for regeneration of drying towers;

(6) the crude ethylene is fed into the ethylene purification system to obtain ethylene products; and (7) a propylene refrigeration cycle system supplies heat and cold to the ethylene purification system.

The present invention provides a novel production device for preparing ethylene from ethanol, including an ethanol preheater 101, an ethanol evaporation tank 102, an ethanol superheater 103, a heating furnace 104, a first reactor 105, a second reactor 106, a third reactor 107, a first ethanol evaporator 108, a second ethanol evaporator 109, a first gas-liquid separation tank 110, a separation tank discharge pump 111, a product cooler 112, a quenching tower 113, a quenching tower circulating pump 114, a quenching tower cooler 115, a quenching tower bottoms pump 116, a condensate preheater 117, an evaporation tower reboiler 118, an evaporation tower 119, a second gas-liquid separation tank 120, a first ethylene compressor 121, a first ethylene cooler 122, an alkaline washing tower 123, a crude ethylene cooler 124, an alkaline liquor circulating pump 125, a third gas-liquid separation tank 126, a circulating ethylene preheater 133, a first ethylene drying tower 127, a first ethylene drying tower protector 128, a second ethylene drying tower 129, a second ethylene drying tower protector 130, a circulating ethylene cooler 131, a circulating ethylene compressor unit 132, a degassing tank 134, a steam stripping tower 135, a steam stripping tower kettle water pump 136, a steam stripping tower kettle water cooler 137, an ethylene pre-cooler 138, an ethylene evaporator 139, a fuel gas tank 140, a fuel gas heater 141, a circulating ethylene heater 142, a secondary propylene compressor gas supplementing tank 143, an ethylene chiller 144, a demethanizing tower 145, a demethanizing tower reboiler 146, a purification tower 147, a purification tower reboiler 148, a propylene collecting tank 149, a propylene condenser 150, a demethanizing tower cooler 151, a purification tower reflux tank 152, a purification tower top condenser 153, a primary propylene compressor gas supplementing tank 154, a primary propylene compressor 155, a secondary propylene compressor 156 and a complete set of heating and conveying equipment.

The equipment of the molecular sieve drying system 400 is connected in such a manner that a gas phase outlet of the third gas-liquid separation tank 126 is respectively connected with tops of the first ethylene drying tower 127 and the second ethylene drying tower 129; a tower kettle of the first ethylene drying tower 127 is respectively connected with tops of the first ethylene drying tower protector 128 and the second ethylene drying tower protector 130; a tower kettle of the second ethylene drying tower 129 is respectively connected with the tops of the first ethylene drying tower protector 128 and the second ethylene drying tower protector 130; the tower kettle of the first ethylene drying tower 127, a tower kettle of the first ethylene drying tower protector 128, the tower kettle of the second ethylene drying tower 129 and a tower kettle of the second ethylene drying tower protector 130 are connected with an outlet in a heating side of the circulating ethylene preheater 133; the tops of the first ethylene drying tower 127 and the second ethylene drying tower 129 are connected with an inlet in a cooling side of the circulating ethylene cooler 131; an outlet in the cooling side of the circulating ethylene cooler 131 is connected with an inlet of the circulating ethylene compressor unit 132; and the tower kettles of the first ethylene drying tower protector 128 and the second ethylene drying tower protector 130 are connected with an inlet in a cooling side of the circulating ethylene precooler 138.

In the above technical solution, a specific implementation of step (1) is as follows: a raw material of ethanol enters the ethanol evaporation tank 102 for evaporation after being preheated by the ethanol preheater 101, and reaction gas generated by the reaction of heated ethanol steam through the heating furnace and the reactors enters the first gas-liquid separation tank 110 after its heat is recovered. A separated liquid phase is fed into the evaporation tower 119, and a gas phase is fed into the quenching tower 113.

In the above technical solution, a specific implementation of step (2) is as follows: the reaction gas from the ethanol dehydration system 100 is fed into the quenching tower 113 to be further cooled after being cooled, streams obtained on a top of the quenching tower 113 are fed into the second gas-liquid separation tank 120 for gas-liquid separation, and crude ethylene is obtained and fed into the alkaline washing system 300. A liquid phase in a tower kettle of the quenching tower 113 and the reaction gas are heat exchanged to obtain condensate, and the obtained condensate is fed into the evaporation tower 119 after being preheated, recovered steam obtained on the top of the evaporation tower 119 is fed back to the ethanol dehydration reaction system to serve as diluted steam, and residual waste liquor obtained in a tower kettle of the evaporation tower 119 is fed to the outside of a boundary region for waste liquor treatment.

In the above technical solution, a specific implementation of step (3) is as follows: the crude ethylene from the quenching compression system 200 is fed into a bottom of the alkaline washing tower 123 after being cooled, and desalted water is fed into a top of the alkaline washing tower 123 for leaching, so as to remove a carbon dioxide component from the crude ethylene. Waste alkaline liquor and waste water in a tower kettle are fed into the degassing tank 134 after converging. Ethylene, water and the like obtained on the top of the alkaline washing tower 123 are fed into the third gas-liquid separation tank 126 after being cooled. A separated gas phase is fed into the molecular sieve drying system 400, and a liquid phase is fed into the degassing tank 134. A gas phase exhausted out of the degassing tank 134 returns to the quenching tower 113, and a liquid phase enters the steam stripping tower 135. A gas phase separated out of the steam stripping tower 135 is fed to the outside of the boundary region for waste gas treatment, and tower bottoms are fed to the outside of the boundary region for sewage treatment after being cooled.

In the above technical solution, a specific implementation of step (4) is as follows: the crude ethylene and the water fed from the alkaline washing system 300 enter the first ethylene drying tower 127 and the second ethylene drying tower 129 and the protectors thereof, and dry crude ethylene obtained after dehydrating and drying is fed into the ethylene purification system 500 for further treatment.

In the above technical solution, a specific implementation of step (5) is as follows: first ethylene drying tower 127 and the second ethylene drying tower 129 and the protectors thereof need to be regenerated after adsorption saturation. The regeneration process consists of depressurizing, heating, cooling and pressurizing processes. In the depressurizing process, gases exhausted out of first ethylene drying tower 127 or the second ethylene drying tower 129 and the protector thereof are fed into the quenching tower 113 after being boosted by the circulating ethylene compressor unit 132. After pressure of the drying towers is decreased to 0.15-0.18 Mpa, the circulating ethylene from the circulating ethylene preheater 133 is used for purging and heating from bottom to top, and the circulating ethylene is firstly heated to 100° C.-140° C. by the circulating ethylene preheater 133 before performing purging and heating on beds of the drying towers. Heating stops after temperature of the beds rises to a set value, and the circulating ethylene continues to perform purging and cooling on the beds of the drying towers. Gases exhausted during heating and cooling of the beds are cooled by the circulating ethylene cooler 131 and fed into the quenching tower 113 after being boosted by the circulating ethylene compressor unit 132. After temperature of an absorber is cooled to 100° C.-140° C., firstly, the circulating ethylene is used for pressurizing the beds to 1.7-2.0 Mpa, and then high-pressure dry ethylene exhausted out of the drying towers during adsorption operation continues to pressurize the beds into a balanced state. The regenerated drying towers wait for entering a next adsorption/regeneration cycle.

In the above technical solution, a specific implementation of step (6) is as follows: the crude ethylene from the molecular sieve drying system 400 is fed into the demethanizing tower 145 after being cooled, one part of light component impurities obtained on a top of the demethanizing tower 145 reflux, and the other part thereof is fed into the fuel gas tank 140; and crude ethylene obtained on a tower kettle of the demethanizing tower 145 is fed into the purification tower 147, and materials in the tower kettle are fed into the fuel gas tank 140. Overhead gas enters the purification tower reflux tank 152 after being condensed, one part of ethylene serves as reflux liquid, the other part thereof is adiabatically flashed to obtain low-temperature ethylene, and the low-temperature ethylene is fed into the molecular sieve drying system 400. The rest of products of ethylene in the purification tower reflux tank 152 are heated to set temperature to obtain ethylene products, and the ethylene products are fed to the outside of the boundary region.

In the above technical solution, a specific implementation of step (7) is as follows: the propylene refrigeration cycle system 600 supplies heat and cold to the ethylene purification system 500, and a liquid phase of propylene obtained after heat exchange is fed into the propylene collecting tank 149. The liquid phase of propylene in the propylene collecting tank 149 is fed into the primary propylene compressor gas supplementing tank 154 for gas-liquid separation after being cooled, the liquid phase of propylene is temporarily stored in the tank, and a gas phase enters the primary propylene compressor 156 after being compressed.

Figure 2:
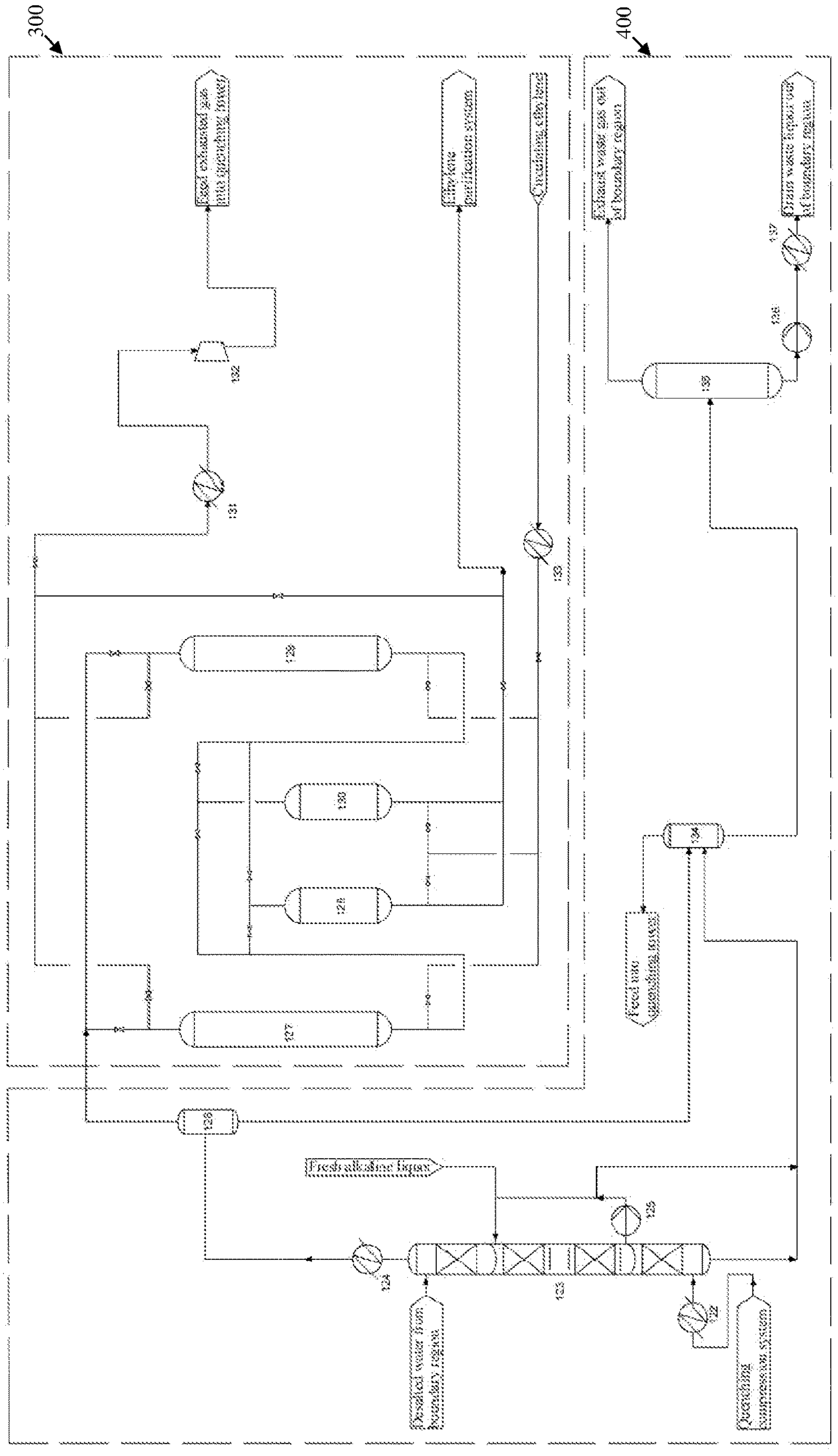
FIG. 2 is a flow diagram of an alkaline washing system and a molecular sieve drying system of a preparation system of ethylene by ethanol dehydration according to the present invention.
Figure 3:
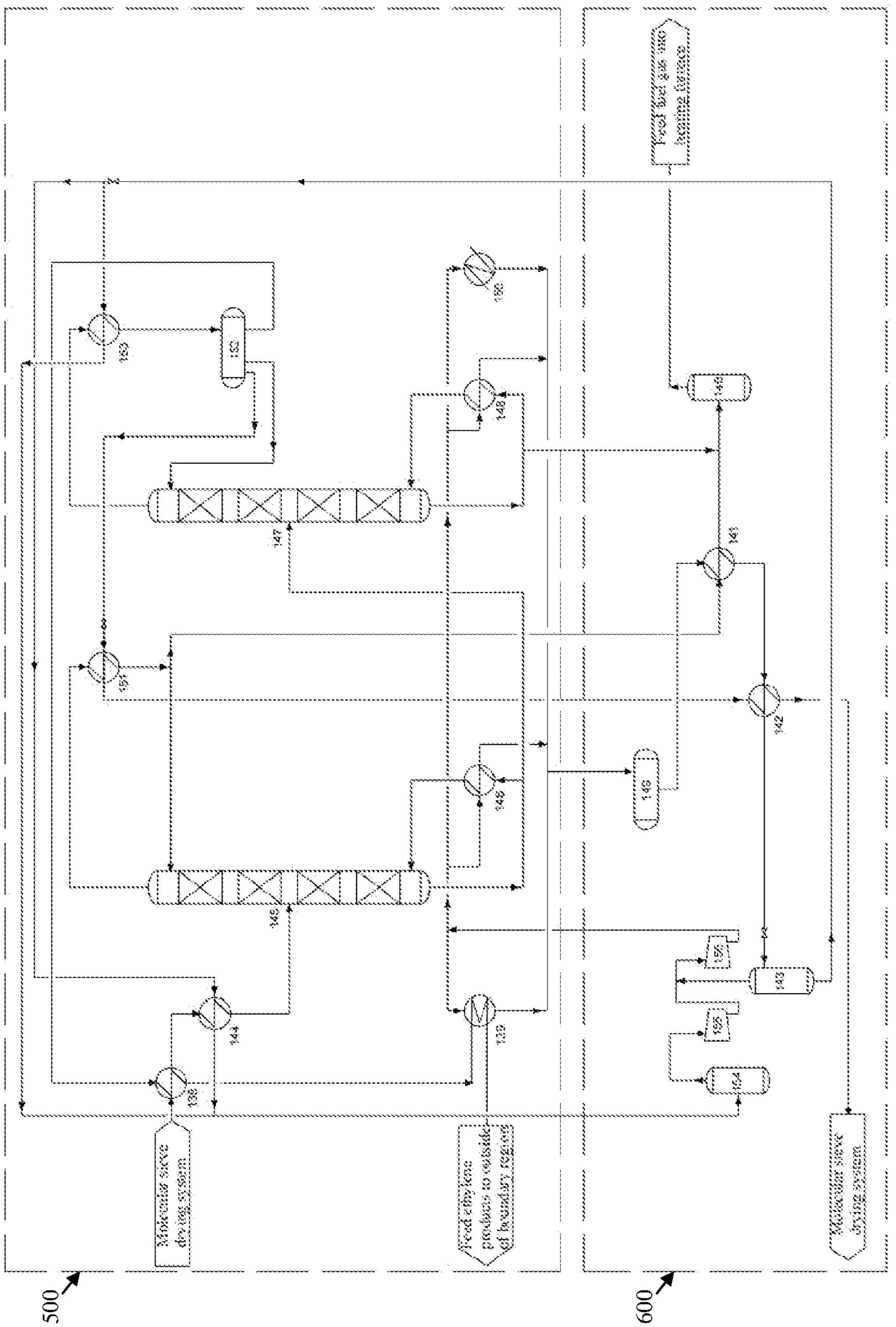
FIG. 3 is a flow diagram of an ethylene purification system and a propylene refrigeration cycle system of a preparation system of ethylene by ethanol dehydration according to the present invention.

FIG. 1 shows a flow diagram of the ethanol dehydration reaction system and the quenching compression system of the process for preparing ethylene by ethanol dehydration of the present invention, FIG. 2 shows a flow diagram of the alkaline washing system and the molecular sieve drying system, and FIG. 3 shows a flow diagram of the ethylene purification system and the propylene refrigeration cycle system.

Operating pressure of the first reactor is 0.75-1.25 Mpa, inlet temperature is 420° C.-520° C., and outlet temperature is 300° C.-430° C.; operating pressure of the second reactor is 0.55-0.95 Mpa, inlet temperature is 420° C.-520° C., and outlet temperature is 300° C.-430° C.; operating pressure of the third reactor is 0.40-0.70 Mpa, inlet temperature is 420° C.-520° C., and outlet temperature is 300° C.-430° C.; operating pressure of the quenching tower is 0.25-0.55 Mpa, top temperature is 30° C.-60° C., and tower kettle temperature is 70° C.-90° C.; operating pressure of the evaporation tower is 1.20-1.45 Mpa, top temperature is 180° C.-225° C., and tower kettle temperature is 190° C.-245° C.; operating pressure of the alkaline washing tower is 1.50-2.30 Mpa, top temperature is 20° C.-46° C., and tower kettle temperature is 30° C.-55° C.; pressure of desorption operation of the drying towers is 0.06-2.00 Mpa, and the temperature of desorption operation is 100° C.-140° C.; operating pressure of the steam stripping tower is 0.22-0.28 Mpa, and operating temperature is 109° C.-139° C. operating pressure of the demethanizing tower is 1.55-2.35 Mpa, top temperature ranges from −83° C. to −56° C., and tower kettle temperature ranges from −43° C. to −26° C.; and operating pressure of the purification tower is 1.55-2.35 Mpa, top temperature ranges from −43° C. to −20° C., and tower kettle temperature ranges from −29° C. to −9° C.

The specific implementation process of the method of the present application is described with the specific embodiments below.

Embodiment 1

A raw material of ethanol enters the ethanol evaporation tank 102 for evaporation after being preheated by the ethanol preheater 101, and reaction gas generated by the reaction of heated ethanol steam through the heating furnace and the reactors enters the first gas-liquid separation tank 110 after its heat is recovered. A separated liquid phase is fed into the evaporation tower 119, and a gas phase is fed into the quenching tower 113.

The reaction gas from the ethanol dehydration system 100 is fed into the quenching tower 113 to be further cooled after being cooled, streams obtained on the top of the quenching tower 113 are fed into the second gas-liquid separation tank 120 for gas-liquid separation, and crude ethylene and the like are obtained and fed into the alkaline washing system 300; and a liquid phase in the tower kettle of the quenching tower 113 and the reaction gas are heat exchanged to obtain condensate, and the obtained condensate is fed into the evaporation tower 119 after being preheated, recovered steam obtained on the top is fed back to the ethanol dehydration reaction system to serve as diluted steam, and residual waste liquor obtained on the tower kettle of the evaporation tower 119 is fed to the outside of the boundary region for waste liquid treatment.

The crude ethylene from the quenching compression system 200 is fed into the bottom of the alkaline washing tower 123 after being cooled, desalted water is fed into the top of the alkaline washing tower 123 for leaching, so as to remove a carbon dioxide component from the crude ethylene, and waste alkaline liquor and waste water in the kettle are fed into the degassing tank 134 after converging. Ethylene, water and the like obtained on the top of the alkaline washing tower 123 are fed into the third gas-liquid separation tank 126 after being cooled. A separated gas phase is fed into the molecular sieve drying system 400, and a liquid phase is fed into the degassing tank 134. A gas phase exhausted out of the degassing tank 134 returns to the quenching tower 113, and a liquid phase enters the steam stripping tower 135. A gas phase separated out of the steam stripping tower 135 is fed to outside of the boundary region for waste gas treatment, and tower bottoms are fed to the outside of the boundary region for sewage treatment after being cooled.

The crude ethylene fed from the alkaline washing system 300 enters the first ethylene drying tower 127 and the second ethylene drying tower 129 and the protectors thereof for dehydrating and drying, and the crude ethylene obtained after dehydrating and drying is fed into the ethylene purification system 500. The water content of the dried crude ethylene is 0.9 ppm. The temperature of desorption operation of the drying towers is 100° C., and the pressure of desorption operation is 0.06 Mpa.

The first ethylene drying tower 127 and the second ethylene drying tower 129 and the protectors thereof need to be regenerated with circulating ethylene as desorbed gas after adsorption saturation. The regeneration process consists of depressurizing, heating, cooling and pressurizing processes. In the depressurizing process, gases exhausted out of the first ethylene drying tower 127 or the second ethylene drying tower 129 and the protector thereof are fed into the quenching tower 113 after being boosted by the circulating ethylene compressor unit 132. After pressure of the drying towers is decreased to 0.15 Mpa, the circulating ethylene from the circulating ethylene preheater 133 is used for purging and heating from bottom to top, and the circulating ethylene is firstly heated to 100° C. by the circulating ethylene preheater 133 to perform purging and heating on the beds of the drying towers. Heating stops after temperature of the beds rises to a set value, and the circulating ethylene continues to perform purging and cooling on the beds of the drying towers. Gases exhausted during heating and cooling of the beds are cooled by the circulating ethylene cooler 131 and fed into the quenching tower 113 after being boosted by the circulating ethylene compressor unit 132. After temperature of an absorber is cooled to 100° C., firstly, the circulating ethylene is used for pressurizing the beds, and after pressure of the beds reaches 1.7 Mpa, high-pressure dry ethylene exhausted out of the drying towers during adsorption operation continues to pressurize the beds into a balanced state. The regenerated drying towers wait for entering a next adsorption/regeneration cycle. The water content of a desorbed molecular sieve is 2%.

The crude ethylene from the molecular sieve drying system 400 is fed into the demethanizing tower 145 after being cooled, one part of light component impurities obtained on the top of the demethanizing tower 145 reflux, and the other part thereof is fed into the fuel gas tank 140. Crude ethylene obtained in the tower kettle of the demethanizing tower 145 is fed into the purification tower 147, and materials in the tower kettle are fed into the fuel gas tank 140. Overhead gas enters the purification tower reflux tank 152 after being condensed, one part of ethylene serves as reflux liquid, the other part thereof is adiabatically flashed to obtain low-temperature ethylene, and the low-temperature ethylene is fed into the molecular sieve drying system 400. The rest of products of ethylene in the purification tower reflux tank 152 are heated to set temperature to obtain ethylene products, and the ethylene products are fed to the outside of the boundary region.

The propylene refrigeration cycle system 600 supplies heat and cold to the ethylene purification system 500, and a liquid phase of propylene obtained after heat exchange is fed into the propylene collecting tank 149; and the liquid phase of propylene in the propylene collecting tank 149 is fed into the primary propylene compressor gas supplementing tank 154 for gas-liquid separation after being cooled, the liquid phase of propylene is temporarily stored in the tank, and a gas phase enters the primary propylene compressor 156 after being compressed.

A feed quantity of the raw material of ethylene in the embodiment is 4,200 kg/hr, ethylene products with a mass fraction of 99.91% are finally obtained, a conversion rate is 99.6%, 1.55 tons of steam is consumed for producing one ton of ethylene, and a regeneration period of a catalyst is 18 months.

Embodiment 2

A raw material of ethanol enters the ethanol evaporation tank 102 for evaporation after being preheated by the ethanol preheater 101, and reaction gas generated by the reaction of heated ethanol steam through the heating furnace and the reactors enters the first gas-liquid separation tank 110 after its heat is recovered. A separated liquid phase is fed into the evaporation tower 119, and a gas phase is fed into the quenching tower 113.

The reaction gas from the ethanol dehydration system 100 is fed into the quenching tower 113 to be further cooled after being cooled, streams obtained on the top of the quenching tower 113 are fed into the second gas-liquid separation tank 120 for gas-liquid separation, and crude ethylene and the like are obtained and fed into the alkaline washing system 300; and a liquid phase in the tower kettle of the quenching tower 113 and the reaction gas are heat exchanged to obtain condensate, and the obtained condensate is fed into the evaporation tower 119 after being preheated, recovered steam obtained on the top of the evaporation tower 119 is fed back to the ethanol dehydration reaction system to serve as diluted steam, and residual waste liquor obtained in the tower kettle of the evaporation tower 119 is fed to the outside of the boundary region for waste liquid treatment.

The crude ethylene from the quenching compression system 200 is fed into the bottom of the alkaline washing tower 123 after being cooled, desalted water is fed into the top for leaching, so as to remove a carbon dioxide component from the crude ethylene, and waste alkaline liquor and waste water in the tower kettle are fed into the degassing tank 134 after converging. Ethylene, water and the like obtained on the top of the alkaline washing tower 123 are fed into the third gas-liquid separation tank 126 after being cooled. A separated gas phase is fed into the molecular sieve drying system 400, and a liquid phase is fed into the degassing tank 134. A gas phase exhausted out of the degassing tank 134 returns to the quenching tower 113, and a liquid phase enters the steam stripping tower 135. A gas phase separated out of the steam stripping tower 135 is fed to outside of the boundary region for waste gas treatment, and tower bottoms are fed to the outside of the boundary region for sewage treatment after being cooled.

The crude ethylene fed from the alkaline washing system 300 enters the first ethylene drying tower 127 and the second ethylene drying tower 129 and the protectors thereof for dehydrating and drying, and the crude ethylene obtained after dehydrating and drying is fed into the ethylene purification system 500. The water content of the dried crude ethylene is 0.85 ppm. The temperature of desorption operation of the drying towers is 150° C., and the pressure of desorption operation is 2.0 Mpa.

The first ethylene drying tower 127 and the second ethylene drying tower 129 and the protectors thereof need to be regenerated with circulating ethylene as desorbed gas after adsorption saturation. The regeneration process consists of depressurizing, heating, cooling and pressurizing processes. In the depressurizing process, gases exhausted out of the first ethylene drying tower 127 or the second ethylene drying tower 129 and the protector thereof are fed into the quenching tower 113 after being boosted by the circulating ethylene compressor unit 132. After pressure of the drying towers is decreased to 0.18 Mpa, the circulating ethylene from the circulating ethylene preheater 133 is used for purging and heating from bottom to top, and the circulating ethylene is firstly heated to 140° C. by the circulating ethylene preheater 133 to perform purging and heating on the beds of the drying towers. Heating stops after temperature of the beds rises to a set value, and the circulating ethylene continues to perform purging and cooling on the beds of the drying towers. Gases exhausted during heating and cooling of the beds are cooled by the circulating ethylene cooler 131 and fed into the quenching tower 113 after being boosted by the circulating ethylene compressor unit 132. After temperature of an absorber is cooled to 140° C., firstly, the circulating ethylene is used for pressurizing the beds, and after pressure of the beds reaches 1.88 Mpa, high-pressure dry ethylene exhausted out of the drying towers during adsorption operation continues to pressurize the beds into a balanced state. The regenerated drying towers wait for entering a next adsorption/regeneration cycle. The water content of a desorbed molecular sieve is 4%.

The crude ethylene from the molecular sieve drying system 400 is fed into the demethanizing tower 145 after being cooled, one part of light component impurities obtained on the top of the demethanizing tower 145 reflux, and the other part thereof is fed into the fuel gas tank 140. Crude ethylene obtained in the tower kettle of the demethanizing tower 145 is fed into the purification tower 147, and materials in the tower kettle are fed into the fuel gas tank 140. Overhead gas enters the purification tower reflux tank 152 after being condensed, one part of ethylene serves as reflux liquid, the other part thereof is adiabatically flashed to obtain low-temperature ethylene, and the low-temperature ethylene is fed into the molecular sieve drying system 400. The rest of products of ethylene in the purification tower reflux tank 152 are heated to set temperature to obtain ethylene products, and the ethylene products are fed to the outside of the boundary region.

The propylene refrigeration cycle system 600 supplies heat and cold to the ethylene purification system 500, and a liquid phase of propylene obtained after heat exchange is fed into the propylene collecting tank 149. The liquid phase of propylene in the propylene collecting tank 149 is fed into the primary propylene compressor gas supplementing tank 154 for gas-liquid separation after being cooled, the liquid phase of propylene is temporarily stored in the tank, and a gas phase enters the primary propylene compressor 156 after being compressed.

A feed quantity of the raw material of ethylene in the embodiment is 4,500 kg/hr, ethylene products with a mass fraction of 99.91% are finally obtained, a conversion rate is 99.6%, and 1.56 tons of steam is consumed for producing one ton of ethylene.

Embodiment 3

A raw material of ethanol enters the ethanol evaporation tank 102 for evaporation after being preheated by the ethanol preheater 101, and reaction gas generated by the reaction of heated ethanol steam through the heating furnace and the reactors enters the first gas-liquid separation tank 110 after its heat is recovered. A separated liquid phase is fed into the evaporation tower 119, and a gas phase is fed into the quenching tower 113.

The reaction gas from the ethanol dehydration system 100 is fed into the quenching tower 113 to be further cooled after being cooled, streams obtained on the top of the quenching tower 113 are fed into the second gas-liquid separation tank 120 for gas-liquid separation, and obtained crude ethylene is fed into the alkaline washing system 300. A liquid phase in the tower kettle of the quenching tower 113 and the reaction gas are heat exchanged to obtain condensate, and the obtained condensate is fed into the evaporation tower 119 after being preheated, recovered steam obtained on the top of the evaporation tower 119 is fed back to the ethanol dehydration reaction system to serve as diluted steam, and residual waste liquor obtained in the tower kettle of the evaporation tower 119 is fed to the outside of the boundary region for waste liquid treatment.

The crude ethylene from the quenching compression system 200 is fed into the bottom of the alkaline washing tower 123 after being cooled, desalted water is fed into the top for leaching, so as to remove a carbon dioxide component from the crude ethylene, and waste alkaline liquor and waste water in the tower kettle are fed into the degassing tank 134 after converging. Ethylene, water and the like obtained on the top of the alkaline washing tower 123 are fed into the third gas-liquid separation tank 126 after being cooled. A separated gas phase is fed into the molecular sieve drying system 400, and a liquid phase is fed into the degassing tank 134. A gas phase exhausted out of the degassing tank 134 returns to the quenching tower 113, and a liquid phase enters the steam stripping tower 135. A gas phase separated out of the steam stripping tower 135 is fed to the outside of the boundary region for waste gas treatment, and tower bottoms are fed to the outside of the boundary region for sewage treatment after being cooled.

The crude ethylene fed from the alkaline washing system 300 enters the first ethylene drying tower 127 and the second ethylene drying tower 129 and the protectors thereof for dehydrating and drying, and the crude ethylene obtained after dehydrating and drying is fed into the ethylene purification system 500. The water content of the dried crude ethylene is 0.9 ppm. The temperature of desorption operation of the drying towers is 130° C., and the pressure of desorption operation is 1.00 Mpa.

The first ethylene drying tower 127 and the second ethylene drying tower 129 and the protectors thereof need to be regenerated with circulating ethylene as desorbed gas after adsorption saturation. The regeneration process consists of depressurizing, heating, cooling and pressurizing processes. In the depressurizing process, gases exhausted out of the first ethylene drying tower 127 or the second ethylene drying tower 129 and the protector thereof are fed into the quenching tower 113 after being boosted by the circulating ethylene compressor unit 132. After pressure of the drying towers is decreased to 0.16 Mpa, the circulating ethylene from the circulating ethylene preheater 133 is used for purging and heating from bottom to top, and the circulating ethylene is firstly heated to 130° C. by the circulating ethylene preheater 133 to perform purging and heating on the beds of the drying towers. Heating stops after temperature of the beds rises to a set value, and the circulating ethylene continues to perform purging and cooling on the beds of the drying towers. Gases exhausted during heating and cooling of the beds are cooled by the circulating ethylene cooler 131 and fed into the quenching tower 113 after being boosted by the circulating ethylene compressor unit 132. After temperature of an absorber is cooled to 130° C., firstly, the circulating ethylene is used for pressurizing the beds, and after pressure of the beds reaches 1.9 Mpa, high-pressure dry ethylene exhausted out of the drying towers during adsorption operation continues to pressurize the beds into a balanced state. The regenerated drying towers wait for entering a next adsorption/regeneration cycle. The water content of a desorbed molecular sieve is 6%.

The crude ethylene from the molecular sieve drying system 400 is fed into the demethanizing tower 145 after being cooled, one part of light component impurities obtained on the top of the demethanizing tower 145 reflux, and the other part thereof is fed into the fuel gas tank 140; and crude ethylene obtained in the tower kettle of the demethanizing tower 145 is fed into the purification tower 147, and materials in the tower kettle are fed into the fuel gas tank 140. Overhead gas enters the purification tower reflux tank 152 after being condensed, one part of ethylene serves as reflux liquid, the other part thereof is adiabatically flashed to obtain low-temperature ethylene, and the low-temperature ethylene is fed into the molecular sieve drying system 400. The rest of products of ethylene in the purification tower reflux tank 152 are heated to set temperature to obtain ethylene products, and the ethylene products are fed to the outside of the boundary region.

The propylene refrigeration cycle system 600 supplies heat and cold to the ethylene purification system 500, and a liquid phase of propylene obtained after heat exchange is fed into the propylene collecting tank 149. The liquid phase of propylene in the propylene collecting tank 149 is fed into the primary propylene compressor gas supplementing tank 154 for gas-liquid separation after being cooled, the liquid phase of propylene is temporarily stored in the tank, and a gas phase enters the primary propylene compressor 156 after being compressed.

A feed quantity of the raw material of ethylene in the embodiment is 4,800 kg/hr, ethylene products with a mass fraction of 99.91% are finally obtained, a conversion rate is 99.6%, and 1.57 tons of steam is consumed for producing one ton of ethylene produced.

The present invention has the technical beneficial effects that by adopting the circulating ethylene as the desorbed gas, regeneration operation of the drying towers is achieved by means of internal circulation of ethylene, so as to improve the green production level.

Equipment unspecified in the present invention is conventional equipment, and it can be achieved by adopting methods and equipment well known to those skilled in the art. Although the present invention has been described with reference to the specific implementation solutions and drawings, the present invention is not expected to be limited to the specific form here. On the contrary, the scope of the present invention is only limited by the appended claims. In addition, although independent features may be included in different claims, these features may be advantageously combined, and the inclusion in different claims does not mean that the combination of features is not feasible and/or advantageous. References to "first", "second," etc., do not exclude plurals.

What is claimed is:

1. A preparation system of ethylene by ethanol dehydration, comprising an ethanol dehydration reaction system, a quenching compression system, an alkaline washing system, a molecular sieve drying system, an ethylene purification system and a propylene refrigeration cycle system;

the ethanol dehydration reaction system comprises an ethanol preheater, an ethanol evaporation tank, an ethanol superheater, a heating furnace, a first reactor, a second reactor, a third reactor, a first ethanol evaporator, a second ethanol evaporator, and a first gas-liquid separation tank;

the quenching compression system comprises a separation tank discharge pump, a product cooler, a quenching tower, a quenching tower circulating pump, a quenching tower cooler, a quenching tower bottoms pump, a condensate preheater, an evaporation tower reboiler, an evaporation tower, a second gas-liquid separation tank, and a first ethylene compressor;

the alkaline washing system comprises a first ethylene cooler, an alkaline washing tower, a crude ethylene cooler, an alkaline liquor circulating pump, a third gas-liquid separation tank, a degassing tank, a steam stripping tower, a steam stripping tower kettle water pump, and a steam stripping tower kettle water cooler;

the molecular sieve drying system comprises a circulating ethylene preheater, ethylene drying towers, ethylene drying tower protectors, a circulating ethylene cooler, a circulating ethylene compressor unit and a complete set of heating and conveying equipment;

the ethylene purification system comprises an ethylene precooler, an ethylene evaporator, an ethylene chiller, a demethanizing tower, a demethanizing tower reboiler, a purification tower, a purification tower reboiler, a propylene condenser, a demethanizing tower cooler, a purification tower reflux tank, a purification tower top condenser; and the propylene refrigeration cycle system comprises a fuel gas tank, a fuel gas heater, a circulating ethylene heater, a secondary propylene compressor gas supplementing tank, a propylene collecting tank, a primary propylene compressor gas supplementing tank, a primary propylene compressor, and a secondary propylene compressor;

wherein a method adopted by the molecular sieve drying system comprises the following steps:

(1) feeding crude ethylene and water from the alkaline washing system into the molecular sieve drying system, and after removing the water therefrom, feeding the obtained crude ethylene into the ethylene purification system; and (2) feeding part of ethylene, acting as circulating ethylene, produced by the ethylene purification system into the molecular sieve drying system to serve as desorbed gas for regeneration of drying towers; and feeding the desorbed circulating ethylene back to the quenching compression system after cooling compression.

2. The preparation system of ethylene by ethanol dehydration according to claim 1, wherein the ethylene drying towers and the protectors thereof need to be regenerated after adsorption saturation, and the regeneration process consists of depressurizing, heating, cooling and pressurizing processes; in the depressurizing process, gases exhausted by the ethylene drying towers and the protectors thereof are fed into a quenching tower after being boosted by the circulating ethylene compressor unit; after pressure of the drying towers is decreased to a set value, the circulating ethylene from the circulating ethylene preheater is used for purging and heating from bottom to top, and the circulating ethylene is firstly heated to a set value by the circulating ethylene preheater to perform purging and heating on beds of the drying towers; heating stops after temperature of the beds rises to a set value, and the circulating ethylene continues to perform purging and cooling on the beds of the drying towers; gases exhausted during heating and cooling of the beds are cooled by the circulating ethylene cooler and fed into the quenching tower after being boosted by the circulating ethylene compressor unit; and after the drying towers are cooled to certain temperature, firstly, the circulating ethylene is used for pressurizing the beds, after pressure of the beds reaches a set value, high-pressure dry ethylene exhausted out of the drying towers during adsorption operation continues to pressurize the beds into a balanced state, and the regenerated drying towers wait for entering a next adsorption/regeneration cycle.

3. The preparation system of ethylene by ethanol dehydration according to claim 1, wherein pressure of desorption operation of the drying towers is 0.06-2.00 Mpa, and the temperature of desorption operation is 100° C.-140° C.

4. The preparation system of ethylene by ethanol dehydration according to claim 1, wherein in devices of the molecular sieve drying system, gas phase outlets of gas-liquid separation tanks are respectively connected with tops of a first ethylene drying tower and a second ethylene drying tower through pipelines; a tower kettle of the first ethylene drying tower is respectively connected with tops of a first ethylene drying tower protector and a second ethylene drying tower protector; a tower kettle of the second ethylene drying tower is respectively connected with the tops of the first ethylene drying tower protector and the second ethylene drying tower protector; the tower kettle of the first ethylene drying tower, a tower kettle of the first ethylene drying tower protector, the tower kettle of the second ethylene drying tower and a tower kettle of the second ethylene drying tower protector are connected with an outlet in a heating side of the circulating ethylene preheater; the tops of the first ethylene drying tower and the second ethylene drying tower are connected with an inlet in a cooling side of the circulating ethylene cooler; an outlet in the cooling side of the circulating ethylene cooler is connected with an inlet of the circulating ethylene compressor unit; and the tower kettles of the first ethylene drying tower protector and the second ethylene drying tower protector are connected with an inlet in a cooling side of a circulating ethylene precooler.

5. The preparation system of ethylene by ethanol dehydration according to claim 1, wherein a raw material of ethanol enters the ethanol evaporation tank for evaporation after being preheated by the ethanol preheater, and reaction gas generated by the reaction of heated ethanol steam through the heating furnace and the reactors enters the first gas-liquid separation tank after its heat is recovered; and a separated liquid phase is fed into the evaporation tower.

6. The preparation system of ethylene by ethanol dehydration according to claim 5, wherein the reaction gas from the ethanol dehydration system is fed into the quenching tower to be further cooled, streams obtained on a top of the quenching tower are fed into the second gas-liquid separation tank for gas-liquid separation, and crude ethylene is obtained and fed into the alkaline washing system; and a liquid phase in a tower kettle of the quenching tower and the reaction gas are heat exchanged to obtain condensate, and the obtained condensate is fed into the evaporation tower after being preheated, recovered steam obtained on the top of the evaporation tower is fed back to the ethanol dehydration reaction system to serve as diluted steam, and residual waste liquor obtained in a tower kettle of the evaporation tower is fed to the outside of a boundary region for waste liquor treatment.

7. The preparation system of ethylene by ethanol dehydration according to claim 6, wherein the crude ethylene from the quenching compression system is fed into a bottom of the alkaline washing tower after being cooled, and desalted water is fed into a top of the alkaline washing tower for leaching, so as to remove a carbon dioxide component from the crude ethylene;

waste alkaline liquor and waste water in a tower kettle are fed into the degassing tank after converging;

ethylene, water and the like obtained on the top of the alkaline washing tower are fed into the third gas-liquid separation tank after being cooled;

a separated gas phase is fed into the molecular sieve drying system, and a liquid phase is fed into the degassing tank;

a gas phase exhausted out of the degassing tank returns to the quenching tower, and a liquid phase enters the steam stripping tower; and a gas phase separated out of the steam stripping tower is fed to the outside of the boundary region for waste gas treatment, and tower bottoms are fed to the outside of the boundary region for sewage treatment after being cooled.

8. The preparation system of ethylene by ethanol dehydration according to claim 7, wherein the crude ethylene and the water fed from the alkaline washing system enter the first ethylene drying tower and the second ethylene drying tower and the protectors thereof, and dry crude ethylene obtained after dehydrating and drying is fed into the ethylene purification system for further treatment.

9. The preparation system of ethylene by ethanol dehydration according to claim 8, wherein the first ethylene drying tower and the second ethylene drying tower and the protectors thereof are regenerated after adsorption saturation;

the regeneration process consists of depressurizing, heating, cooling and pressurizing processes;

in the depressurizing process, gases exhausted out of the first ethylene drying tower or the second ethylene drying tower and the protector thereof are fed into the quenching tower after being boosted by the circulating ethylene compressor unit;

after pressure of the drying towers is decreased to 0.15-0.18 MPa, the circulating ethylene from the circulating ethylene preheater is used for purging and heating from bottom to top, and the circulating ethylene is firstly heated to 100° C.-140° C. by the circulating ethylene preheater before performing purging and heating on beds of the drying towers;

heating stops after temperature of the beds rises to a set value, and the circulating ethylene continues to perform purging and cooling on the beds of the drying towers;

gases exhausted during heating and cooling of the beds are cooled by the circulating ethylene cooler and fed into the quenching tower after being boosted by the circulating ethylene compressor unit;

after temperature of an absorber is cooled to 100° C.-140° C., firstly, the circulating ethylene is used for pressurizing the beds to 1.7-2.0 MPa, and high-pressure dry ethylene exhausted out of the drying towers during adsorption operation continues to pressurize the beds into a balanced state; and the regenerated drying towers wait for entering a next adsorption/regeneration cycle.

10. The preparation system of ethylene by ethanol dehydration according to claim 9, wherein the crude ethylene from the molecular sieve drying system is fed into the demethanizing tower after being cooled, one part of light component impurities obtained on a top of the demethanizing tower reflux, and the other part thereof is fed into the fuel gas tank; and crude ethylene obtained on a tower kettle of the demethanizing tower is fed into the purification tower, and materials in the tower kettle are fed into the fuel gas tank;

overhead gas enters the purification tower reflux tank after being condensed, one part of ethylene serves as reflux liquid, the other part thereof is adiabatically flashed to obtain low-temperature ethylene, and the low-temperature ethylene is fed into the molecular sieve drying system; and the rest of products of ethylene in the purification tower reflux tank are heated to set temperature to obtain ethylene products, and the ethylene products are fed to the outside of the boundary region.

11. The preparation system of ethylene by ethanol dehydration according to claim 10, wherein the propylene refrigeration cycle system supplies heat and cold to the ethylene purification system, and a liquid phase of propylene obtained after heat exchange is fed into the propylene collecting tank; and the liquid phase of propylene in the propylene collecting tank is fed into the primary propylene compressor gas supplementing tank for gas-liquid separation after being cooled, the liquid phase of propylene is temporarily stored in the tank, and a gas phase enters the primary propylene compressor after being compressed.

* * * * *